United States Patent Office 3,316,897
Patented May 2, 1967

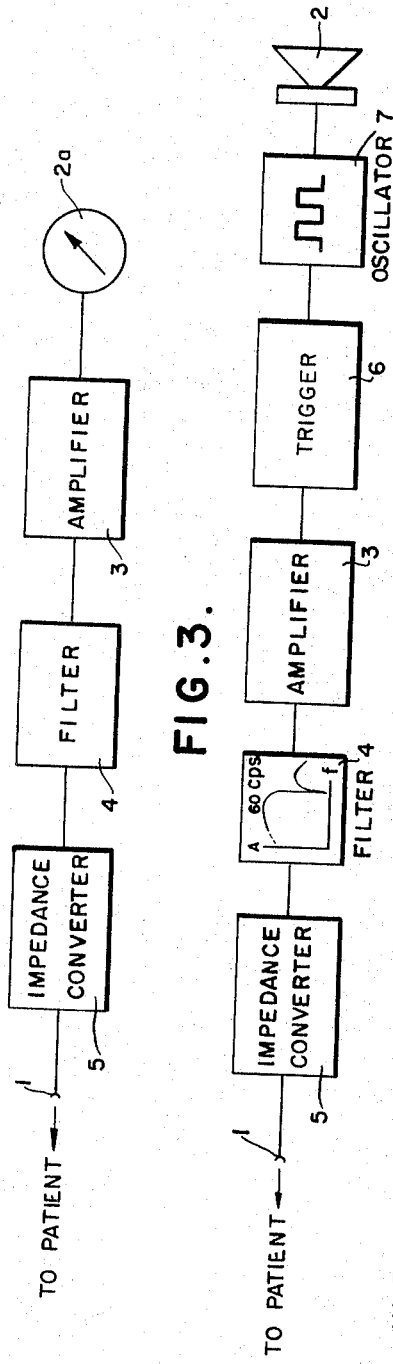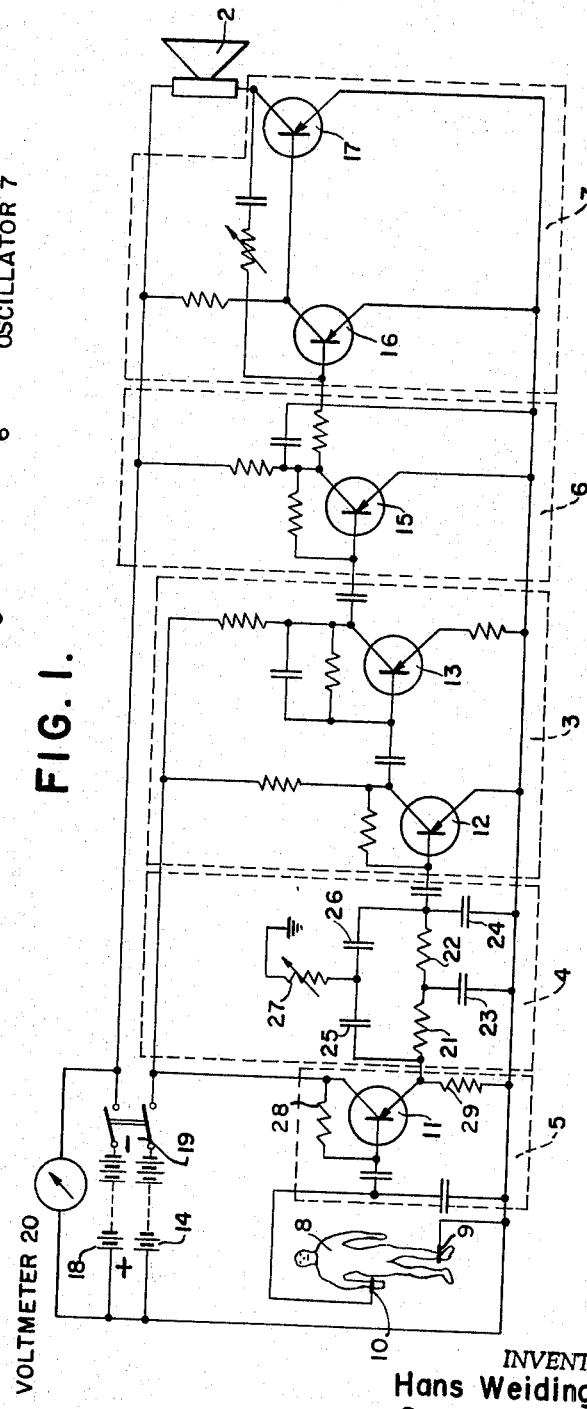

3,316,897
HEART MONITORING DEVICE WITH FILTER FOR SUPPRESSING THE FREQUENCY OF AN AMBIENT A.C. POWER SOURCE
Hans Weidinger and Gustav Volbehr, Heidelberg-Kirchheim, Wolfgang Limpert, Nussloch, and Hartwig Steusloff, Heidelberg-Wieblingen, Germany, assignors to Teldix Luftfahrt-Ausrustungs G.m.b.H., Heidelberg-Wieblingen, Germany
Filed Dec. 21, 1964, Ser. No. 419,648
Claims priority, application Germany, Dec. 21, 1963, T 25,319
8 Claims. (Cl. 128—2.06)

The present invention relates to an apparatus for monitoring the heart action.

More particularly, the present invention relates to an apparatus by means of which the heart action can be continuously monitored in response to the voltage produced by the action of the heart muscle.

Conventional electrocardiographic apparatus, be they equipped with cathode ray or oscillograph tubes which allow the wave form of the heart voltage to be seen on a screen or with permanent recorder-type output devices which write the wave form onto graph paper, so as to produce a permanent ink tracing, can not properly be considered heart monitoring devices inasmuch as such electrocardiographs serve primarily for diagnostic purposes and must therefore be able to meet very high standards of resolution, so that the typical electrocardiograph is, in practice, too expensive and complicated to serve simply as heart monitoring devices for detecting the existence of the heart beat.

There exists a heart monitoring device which operates in conjunction with an electrocardiograph and which monitors the heart frequency. This apparatus is provided with means which cause an alarm signal to be triggered whenever the heart of the patient beats at a rate which is faster or slower than a given predetermined rate. As with all other existing electrocardiograph-type equipment, this apparatus, too, has the serious drawback that its use is, for all practical purposes, limited to the clinical. Furthermore, the apparatus involved, due to its inherent complexity, generally requires the presence of a number of qualified technicians. Also, the equipment is dependent upon a high-voltage power supply so that for this reason, too, it does not readily lend itself for use in the field, i.e., outside of the clinical environment.

Conventional electrocardiograph amplifiers are in the form of so-called differential amplifiers, i.e., two-channel amplifiers in which noise voltages produced by stray fields cancel each other. However, in order to obtain exact cancellation, the set has to be meticulously adjusted by means of potentiometers and the like, all of which is very time consuming. Another delay is encountered by the fact that it usually takes several minutes until the charges on the patient and the equipment have balanced each other, so that the equipment as a whole can not be properly adjusted and calibrated until the so-called warm-up time is completed.

It is, therefore, the primary object of the present invention to provide a heart monitoring device which overcomes the above drawbacks, namely, a heart monitoring device which itself is compact and capable of operating independently of any external supply voltage, which device is free of any adjusting organs that have to be manipulated in order to place the device in operation and which, therefore, can readily be used in the field, by untrained personnel for purposes of monitoring the heart action of a patient, so that, for example in the case of an accident, the victim's heart can be checked on the scene.

With the above objects in view, the present invention resides mainly in a heart monitoring device which comprises input means connectible to a patient for picking up a voltage produced by the action of the patient's heart, output means for giving an indication of the patient's heart beat, noise-frequency filter means having an input connected to the input means, and a transistorized amplifier having an input connected to the output of the filter means and an output connected to the output means for amplifying the voltage picked up on the input means to give, on the output means, a perceptible indication of the heart beat of the patient.

The amplifier used in the heart monitoring device according to the present invention is a straight amplifier, as opposed to the differential amplifier of the type used in conventional electrocardiographs. Heretofore, such electrocardiographs could not make do without the differential amplifier inasmuch as the same is needed in order to allow the tracing means or the oscilloscope to bring out the details of the electrocardiogram. The present invention, on the other hand, is based on the consideration that, for a heart monitoring device of the type suitable for use by the layman, a simple straight amplifier is adequate, provided, however, the device is rendered sufficiently immune to so-called "noise," i.e., spurious signals, this being achieved by the noise-frequency filter means which are interposed between the input means and the amplifier, which filter means serve to suppress substantially completely the frequency of an A.C. power source present in the vicinity in which the heart monitoring device is to be used, e.g., the 60 c.p.s. frequency of normal house current. In practice, the frequency filter will be a filter for passing frequencies of between approximately 2 and 10 c.p.s., which has been found sufficient to enable the heart beat of the patient to be monitored, even when the patient is in shock, for example, in the case where the patient has been involved in an accident. In accordance with the present invention, the input means comprise electrode means connectible to the patient and a transistorized impedance converter having an input connected to the electrode means, the output of the impedance converter constituting the output of the input means and being connected to the input of the amplifier. The impedance converter includes a transistor having an emitter circuit which includes an emitter resistor and a collector circuit which is free of any collector resistor, whereby the impedance of the patient is matched to that of the circuit constituted by the filter means, the amplifier and the output means.

Additional objects and advantages of the present invention will become apparent upon consideration of the following description when taken in conjunction with the accompanying drawings in which:

FIGURE 1 is a block diagram of one embodiment of a heart monitoring device according to the present invention.

FIGURE 2 is an electric circuit diagram of the heart monitoring device shown in FIGURE 1.

FIGURE 3 is a block diagram of another embodiment of a heart monitoring device according to the present invention.

Figure 5:
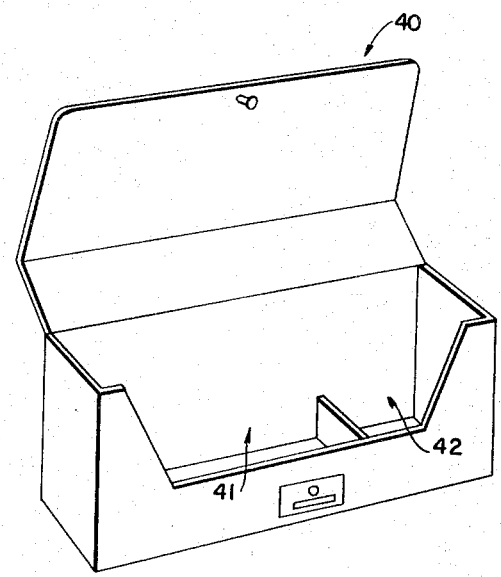
FIGURE 5 is a perspective view of a compartmented carrying case for receiving the heart monitoring device shown in FIGURE 5.

Referring now to the drawings and first to FIGURE 1 thereof, the same shows a heart monitoring device comprising an input 1 to which the voltage produced by the action of the heart muscle is applied, and an output, in the form of a small speaker 2, at which the heart beat can be heard. The amplifier is constituted by a straight amplifier 3, to whose input there is connected the output of a noise-frequency filter 4, which passes a band whose width is between about 2 and 10 c.p.s., and which suppresses the other frequencies, the attenuation factor being different for the various frequencies, except that—for the reasons to be described below—the 60 c.p.s. frequency is filtered out practically completely. The input of the filter is connected to the output of an impedance converter 5 the purpose of which is to increase the input resistance, the input 1 being connected to the input of the impedance converter 5. Connected to the output of the amplifier 3 is the input of a trigger 6 which, in turn, has its output connected to the input of an oscillator in the form of a square-wave generator 7 whose output is connected to the input of the speaker 2. The trigger 6 triggers the oscillations of the square-wave generator 7 as a function of the heart action, thereby to make the heart action audible through the speaker 2.

FIGURE 2 shows the patient 8 to whose left foot there is connected an electrode 9 which is electrically connected to the positive terminal of the power supply, the same being constituted by two batteries 14, 18. The right arm of the patient is connected to an electrode which is electrically connected to the base of a first transistor 11, which, together with its circuit components, form the impedance converter 5. These circuit components include a base resistor 28 and an emitter resistor 29 in the emitter circuit, there being no collector resistor in the collector circuit of transistor 11. Of the available extremity points of the human body, it is the latter which produces the highest voltage that can be derived from the heart muscle action, so that this point will be used for purposes of illustration. In practice, however, it is not absolutely essential that the electrodes be applied to the particular arm and leg extremities as shown, it being appreciated that the limb extremities will, in case of accident, usually be readily accessible without it being necessary to change the position of the victim. Nor is it essential that the polarity of the circuit connections be as shown.

The circuit is built up along the lines described above. A first transistor group composed of the already mentioned transistor 11 and the transistors 12 and 13 is energized from the first battery 14, while the speaker 2 and a second transistor group composed of transistors 15, 16, 17, are energized by the second battery 18. The batteries have a voltage of 3 v. and are of the type normally used in portable transistor radios. The batteries 14, 18, are connected to the circuit by means of a two-pole switch 19. The circuit also includes a voltage control meter 20 which is connected across the battery 18—the latter being, in practice, subjected to heavier current drain than the battery 14—so that the charge of the battery 18 can be checked at any time.

The two transistor groups are energized separately by two batteries because in this way the danger of noise-producing coupling effect, which may appear as the batteries become more and more discharged, is eliminated in a very simple manner.

The frequency filter 4 comprises, basically, a low-pass filter made up of the two resistors 21 and 22 and the two capacitors 23 and 24, this low-pass filter being modified, however, by two further capacitors 25 and 26 as well as an adjustable resistor 27, so that the pass characteristic of the filter assumes an abrupt dip at the 60 c.p.s. point, as shown schematically in FIGURE 1. The elements 21, 22, 23, 25, 26, 27 form a so-called double-T RC filter, one T being constituted by the resistors 21, 22 and the capacitor 23 and the other T being constituted by the two capacitors 25, 26 and the resistor 27. By properly adjusting the filter, a given noise frequency can, by using very simple circuitry, be attenuated by about 60 db. In this way, the noise-frequency filter may be adjusted so as to suppress substantially completely the frequency of an A.C. power source present in the vicinity in which the heart monitoring device is to be used, which frequency will usually be a frequency of 60 c.p.s.

The amplifier 3 incorporates the transistors 12 and 13, together with the usual circuit components which, per se, are conventional. The trigger 6 incorporates the transistor 15 and its circuit components, while the oscillator 7 incorporates the transistors 16 and 17 together with the usual circuit components.

The operation of the device is as follows:
After the electrodes 9, 10, have been connected to the patient, the switch 19 is closed, and the heart beat can immediately be heard through the speaker 2, there being no time lag between the instant the device is turned on and the instant at which it is fully operative, i.e., there is no warm-up time during which the various circuit components are stabilized. This, it will be appreciated, is in contradistinction to conventional electrocardiographs incorporating differential amplifiers. Instead, the circuit responds at once to the quantitatively largest oscillation of the voltage produced by the action of the heart muscle, and amplifies this oscillation substantially without noise.

It will be seen from the above that, in accordance with the present invention, there is provided a heart monitoring device which can be put into operation substantially more simply than any existing electrocardiograph which incorporates a differential amplifier. That is to say, thanks to the provision of the straight amplifier, there is now provided a fully transistorized heart monitoring device which can be used outside of the clinical environment, particularly if the device itself is built into a substantially shock-resistant housing within which the components of the heart monitoring device, and the battery means therefor, are received.

In a practical embodiment, the electrical connecting leads by which the electrodes 9, 10, are electrically connected to the remainder of the heart monitoring device are permanently attached at least to these electrodes, and the housing is provided with a compartment for receiving the electrodes and the leads. This results in a complete, ready-to-work unit which can readily be made available at all times in an ambulance or first aid station, so that even a layman can monitor the heart action until the arrival of a physician.

The embodiment described in conjunction with FIGURES 1 and 2 makes use of a speaker, in conjunction with a trigger and oscillator, so that the output means will give an audible indication of the heart beat. While, as shown in FIGURE 3, the output means may be constituted by a meter 2a whose needle deflection indicates a heart beat, it has been found that the output means producing the audible signal is preferable, as, for example, when the heart beat has to be monitored for an extended period, or under conditions of darkness. Furthermore, experience has shown that the ear is better able to discern the rhythm of the heart beat than is the eye, so that the speaker-type output is considered to be more practical than the visual-type output which may include a lamp or, as stated above, a meter. The ear will also be able better to distinguish between sounds due to the heart beat and sounds due to currents flowing as the result of other muscle actions.

Figure 4:
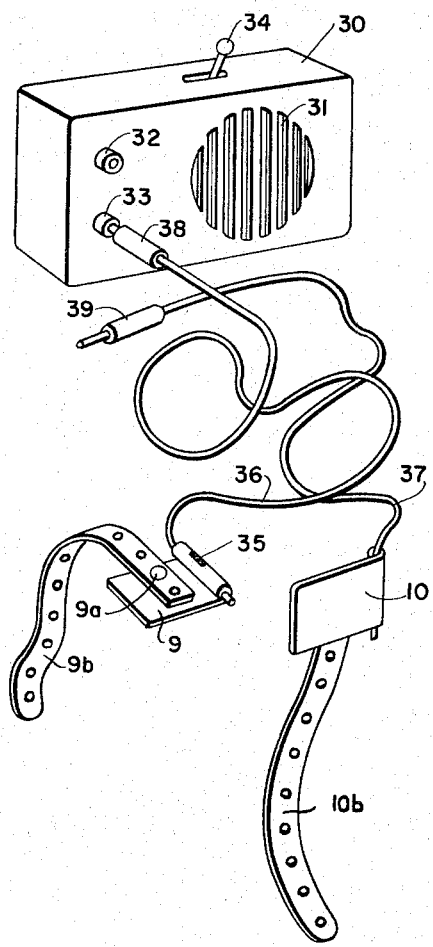
FIGURE 4 is a perspective view of a housing which contains the various components of the heart monitoring device according to the present invention except the electrodes and the leads therefor.

FIGURE 4 shows a shock-resistant housing 30 which is provided with a speaker grill 31, two sockets 32, 33 and an actuator 34 for the switch 19 (FIGURE 2). The housing 30 contains the various components of the heart monitoring device, except for the electrodes 9, 10 and the leads 36, 37, which connect the electrodes to the remainder of the circuit. Each lead 36, 37 is provided at one end with a respective connector plug 38, 39, which may be plugged into one of the sockets 31, 32. The other ends of the leads are permanently attached to the electrodes 9, 10, which, in practice, are constituted by corrosion resistant metal plates. The permanent connection between electrode 9 and its lead 36 is shown by a soldered connection 35. The electrodes are attached to the limb of the patient by means of rubber straps 9b, 10b, which are attached to the respective plates by being placed over a ball-shaped knob that itself is attached to the plate; this is shown, again for the electrode 9, by the knob 9a. The other end of each strap may then be secured to this knob by passing the latter through a convenient perforation of the strap so as properly to secure the metal plate to the patient.

FIGURE 5 shows a leather carrying case 40 which is provided with two compartments 41, 42. Compartment 41 serves to receive the housing 30 while compartment 42 serves to receive the leads and plugs as well as the electrode means, including the rubber straps which secure the metal plates to the patient.

Figure 6:
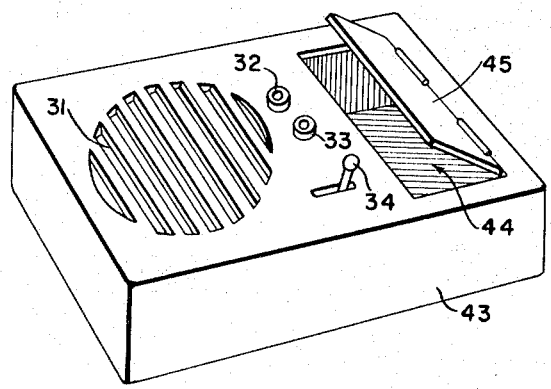
FIGURE 6 is a perspective view of a housing similar to that depicted in FIGURE 4, but provided with a compartment for receiving the electrodes and the leads therefor.

FIGURE 6 shows a housing 43 which is similar to the housing 30 of FIGURE 4 except that housing 43 is provided with a compartment 44 for receiving the electrode means and leads. The compartment 44 is closed by means of a cover 45.

It will be understood that the above description of the present invention is susceptible to various modifications, changes and adaptations, and the same are intended to be comprehended within the meaning and range of equivalents of the appended claims.

What is claimed is:

1. A heart monitoring device, comprising, in combination:
   (a) input means connectible to a patient for picking up a voltage produced by the action of the patient's heart;
   (b) output means for giving an indication of the patient's heart beat;
   (c) noise-frequency filter means having an input connected to said input means and including means for substantially completely suppressing the frequency of an A.C. power source present in the vicinity in which the heart monitoring device is to be used; and
   (d) a transistorized amplifier having an input connected to the output of said filter means and an output connected to said output means for amplifying the voltage picked up by said input means to give, on said output means, a perceptible indication of the heart beat of the patient;
   (e) said input means comprising electrode means connectible to the patient and a transistorized impedance converter having an input connected to said electrode means, the output of said impedance converter constituting the output of said input means and being connected to said input of said amplifier, said impedance converter including a transistor having an emitter circuit which includes an emitter resistor and a collector circuit which is free of any collector resistor whereby the impedance of the patient is matched to that of the circuit constituted by said filter means, said amplifier and said output means.

2. A heart monitoring device as defined in claim 1 wherein in said output means comprise
   (i) a transistorized trigger having an input connected to said output of said amplifier,
   (ii) a transistorized oscillator, incorporating a square wave generator, having an input connected to the output of said trigger, and
   (iii) a speaker through which the heart beat of the patient may be heard having an input connected to the output of said oscillator; the heart monitoring device further comprising a first battery for energizing said amplifier and a second battery for energizing said trigger, said oscillator and said speaker of said output means.

3. A heart monitoring device as defined in claim 2 wherein said impedance converter is connected to said second battery for being energized thereby.

4. A heart monitoring device as defined in claim 1 wherein said filter means comprise a filter for passing frequencies between approximately 2 and 10 c.p.s.

5. A heart monitoring device as defined in claim 1 wherein said filter means include an adjustable component for setting the frequency which said filter means suppress substantially completely.

6. A heart monitoring device as defined in claim 1 wherein said last-mentioned frequency is 60 c.p.s.

7. A heart monitoring device as defined in claim 1 wherein said filter means comprise a double-T RC filter.

8. A heart monitoring device as defined in claim 7 wherein one leg of one T incorporates an adjustable component, thereby to allow the frequency which said filter means suppresses substantially completely to be adjusted.

References Cited by the Examiner

UNITED STATES PATENTS

| | | | |
|---|---|---|---|
| 3,027,891 | 4/1962 | Fields et al. | 128—2.06 |
| 3,144,018 | 8/1964 | Head | 128—2.1 |
| 3,144,019 | 8/1964 | Haber | 128—2.06 |

RICHARD A. GAUDET, *Primary Examiner.*

SIMON BRODER, *Examiner.*